United States Patent [19]
Yamada et al.

[11] Patent Number: 5,805,120
[45] Date of Patent: Sep. 8, 1998

[54] HEAD-UP DISPLAY APPARATUS

[75] Inventors: Satoshi Yamada, Yokohama; Eiji Takuma, Kawasaki, both of Japan

[73] Assignee: Sega Enterprises, Ltd., Tokyo, Japan

[21] Appl. No.: 363,971

[22] Filed: Dec. 23, 1994

Related U.S. Application Data

[63] Continuation of Ser. No. 68,994, May 27, 1993, abandoned.

[30] Foreign Application Priority Data

| May 29, 1992 | [JP] | Japan | 4-163824 |
| Sep. 30, 1992 | [JP] | Japan | 4-286649 |
| Sep. 30, 1992 | [JP] | Japan | 4-286650 |

[51] Int. Cl.$^6$ .................................................... G09G 5/00
[52] U.S. Cl. .................................. 345/7; 345/8; 359/630
[58] Field of Search ............................... 345/7, 8; 348/53, 348/115; 273/313, 316, 310; 434/43; 359/630, 631, 632; 340/980

[56] References Cited

U.S. PATENT DOCUMENTS

| 4,348,185 | 9/1982 | Berglia et al. ............................. 434/43 |
| 4,652,870 | 3/1987 | Steward . |
| 4,866,229 | 9/1989 | Scharfenberg . |
| 4,988,111 | 1/1991 | Gerlizt et al. ............................ 273/310 |
| 5,000,544 | 3/1991 | Stavely . |
| 5,034,809 | 7/1991 | Kotoh . |
| 5,061,996 | 10/1991 | Schittman ................................... 345/7 |
| 5,072,209 | 12/1991 | Hori et al. . |
| 5,177,872 | 1/1993 | Lewis et al. ............................... 33/366 |
| 5,189,512 | 2/1993 | Cameron et al. ............................ 345/8 |
| 5,309,169 | 5/1994 | Lippert ........................................ 345/7 |
| 5,331,149 | 7/1994 | Spritzer et al. ............................. 345/7 |

FOREIGN PATENT DOCUMENTS

| 0408344 | 1/1991 | European Pat. Off. . |
| 3712287 | 9/1988 | Germany . |
| 4-31118 | 8/1987 | Japan . |
| 2216813 | 10/1989 | United Kingdom . |

OTHER PUBLICATIONS

Laser & Application, Dec. 1984, pp. 64–66.

*Primary Examiner*—Regina D. Liang
*Attorney, Agent, or Firm*—Michael N. Meller; Eugene Lieberstein

[57] ABSTRACT

A head-up display apparatus includes a display device for displaying various items of information and a combiner provided in front of an eye of a viewer in a visual field of the viewer, which combiner allows an outside image lying in the visual field to be passed through it and which reflects an image displayed by the display device so that the outside image passed (transmitted) through the combiner and the displayed image reflected thereby are integrated in the same visual field of the viewer, the combiner being configured to be of a substantially spherical shape with a concave surface facing the viewer, and the display device being provided in such a position that a display can be directly observable from the outside through the combiner.

12 Claims, 9 Drawing Sheets

HEAD-UP DISPLAY APPARATUS

This application is a continuation of application Ser. No. 08/068,994 filed May 27, 1993 now abandoned.

BACKGROUND OF THE INVENTION

The present invention relates to a head-up display apparatus, and more particularly to a head-up display apparatus in which a combiner is provided in the immediate proximity of a viewer.

There have been conventionally provided apparatuses using a combiner which allows an outside image lying in a visual field to be passed through it and which reflects an image displayed by the display device so that the displayed image and the outside image such as a natural scenery are spatially superimposed in the same visual field. Such an apparatus is generally called a head-up display apparatus and is used in a number of different ways. When it is used in a mobile body such as a train or aircraft, it allows a visual field in front of the viewer as well as various items of information supplied from the display device to be visible, thus ensuring that the outside is always visible, and allowing one to keep up with abrupt changes.

The conventional head-up display apparatus is configured such that an image 8 supplied from a display device 100 and reflected by a flat combiner 102 is viewed at a viewpoint 1, as depicted in FIG.1. Viewed from the viewpoint 1, the image 8 on the display device 100 appears to be located at a point 103. Provided that a distance between the display device and the combiner 102 is A, a distance between the combiner 102 and the viewpoint 1 is B, and a distance between the combiner 102 and the virtual image point 103 is C, a distance between the virtual image point 103 and the viewpoint 1 is (B+C), which is equal to (A+B). A scenery 104 is generally much further from the viewpoint 1 than the point 103. Since a focal distance of the reflected image 8 displayed by the display device and a focal distance of the outside scenery 104 are different, visual observation of the virtual image 103 and the scenery 104 in the same visual field requires that focal adjustment of the eyes at the viewpoint 1 be effected for each of the images, making it extremely difficult to view the virtual image 103 and the scenery 104 while both of these are in focus.

An optical system for extending the focal distance of the reflected image is conventionally provided.

FIG.2 illustrates an example of the system, in which an image from a display device 105 is caused to pass through a relay lens group 106 provided for decreasing chromatic aberration, and reflected by a return prism 107 and a combiner 108 to reach the viewpoint 1.

Since the conventional head-up display has a configuration such as the above, the construction thereof becomes notably complex and hence the head-up display apparatus becomes expensive. Such a display apparatus also has a disadvantage in that a weight thereof increases due to the need to provide lenses and the like, and space is required for a focal adjustment mechanism. Therefore, it is difficult to obtain a head-up display apparatus in which a planar combiner is embodied by a glass of a visored helmet and provided in the immediate proximity of the viewpoint of the viewer. No effective means to deal with these disadvantages has yet been provided.

It is also to be noted that, when a planar combiner is provided in the immediate proximity of a first viewer, the image displayed by the display device cannot be seen from outside because of the optical system disposed between the planar combiner and the display device. Only the first viewer (hereinafter, simply referred to as the viewer) can view the reflected image from the display device due to the lack of physical space near the viewer and to the complexity of the optical system. As another person cannot visually observe the reflected image, this other person must ask the viewer what the image is or the other person has to take the place of the viewer each time the other person wants to know what the image is. In the case of a head-up display apparatus, this means that a helmet must be taken off and and then put on again, which is troublesome. An immediate proximity head-up display allowing the outsider to easily observe the reflected image is not provided.

SUMMARY OF THE INVENTION

In view of the above-described problems, a first object of the present invention is to provide a head-up display apparatus having a simple configuration, which enables the focal distance of the reflected image with respect to the viewer's viewpoint to be efficiently adjusted, even when the combiner is in the immediate proximity of a viewer. A second object of the present invention is to provide a head-up display apparatus for use in the immediate proximity of a viewer which allows another person to visually observe the contents of a display supplied from the display device.

In order to achieve the above objects, the head-up display apparatus according to the present invention is implemented in the following manner. A head-up display apparatus has a combiner provided in front of a viewer in the viewer's visual field, which combiner allows an outside image lying in the visual field to be passed through it and reflects an image displayed in the display device so that the outside image and the displayed image are integrated in the same visual field of the viewer, an optical system of the head-up display apparatus comprising only the combiner provided in the immediate proximity of the viewer and having a concave surface, and a display part of the display apparatus provided in such a position that a display therein is directly observable from the outside. Further, the combiner may be a half mirror having a spherical surface of a curvature radius of between 80 mm and 150 mm.

To summarize the above, the optical system is comprised of only a combiner provided in the immediate proximity of a viewer and having an inner concave surface and a display part of the display apparatus provided in such a position that a display therein is directly observable from the outside, wherein the combiner can be a half mirror having a spherical surface of a curvature radius of from 80 mm to 150 mm.

When we say directly visible, it means that an image displayed in the display device can be visually observed without a projecting screen, a lens or the like. A half mirror is a thin body having both a reflective function (action of a mirror) as well as a light-transmissive function (action of a transparent body), wherein a ratio of reflection and transmission can have any value including 50:50, for example 10:90.

With the above arrangement, the focal point of the image (display information) supplied from the display device is moved back further from the viewer as the image is reflected by the inner concave surface of the combiner; the image is then recognized by the viewer as a distant virtual image, with the result that the focal distance of the displayed image and the focal distance of the image of the outside become close to each other. Parts of the image supplied from the display device is caused to be transmitted (to be passed) through the combiner so that the viewer and another person can observe the same image.

A conventional ray gun game apparatus such as a shooting game apparatus shown in the Japanese Utility Model Publication 4-31118 is configured such that a player wears a jacket and has a target attached to their breast, the wearer being audibly notified when a beam from an enemy player hits the target.

In the above conventional technology, in which a player take one of the two sides in a ray gun game and fires their ray gun at a beam intercepting apparatus of an enemy player, players have to keep their beam intercepting apparatus exposed to enemy players. Wearing a beam intercepting apparatus on the breast or waist has a disadvantage in that, when a shooting is simulated to take place in a city area, the beam shot by an enemy player may not be received by the beam intercepting apparatus worn on the breast or waist, since usually a player tries to confirm the location of an enemy player before shooting thereat by simply sticking out their head, while in the meantime keeping his or her body hidden.

Moreover, use of the above beam intercepting apparatus, in which each time a beam hits an electronic sound is emitted and a light is lit so as to notify the wearer that the beam has hit, makes it necessary for the wearer to look at the beam intercepting apparatus from time to time because, once the wearer is absorbed in a shooting game, it is difficult for the wearer to keep their current score in mind. Such a necessity to look at the apparatus from time to time is troublesome during a shooting game.

Accordingly, in order to resolve the above problem, a third object of the present invention is to provide a head-up display apparatus applicable to a ray gun game apparatus, which head-up display apparatus provides less unrealistic shooting and eliminates the trouble of looking at a score part from time to time.

The present invention comprises: a main body part applied to an area extending from the right to the left temple of a forehead; and a belt body which connects right and left ends of the main body part and which, when wrapped around the head, fixes the main body part to the head.

There is also provided: a light intercepting part comprising a light sensor for receiving incoming light at a front of the main body part; controlling means built into the main body part, which emits a sound signal on the basis of a light-intercepting signal from the light intercepting part and emits a display signal; a notifying part built into the main body part and embodied by a buzzer, a speaker or a vibrating body, which notifies the viewer by means of a notifying signal; and a display part provided either at the right front or the left front of the main body and embodied by an LED, a liquid crystal display or the like, which produces a display variable according to the display signal. In such a beam intercepting apparatus, a light-transmissive reflective part having a concave surface below and in front of the display part is provided below the main body to face inward.

The beam intercepting display apparatus having the above configuration is operated in the following manner. The players, who divide themselves into two sides, shoot at each other's respective beam intercepting apparatus worn on their heads. When the beam shot by a player is detected by the light intercepting part in the main body part provided on the forehead, a detection signal is sent to the controlling means which sends a signal to a notifying part and the display part so that a hit display is effected, the reflective part reflecting the image supplied from the display part and displayed in front of the main body, so that the image is visible to the viewer.

Other objects, features and advantages of the present invention will become more apparent from the following detailed description when read in conjunction with the following drawings in which:

DESCRIPTION OF THE PREFERRED EMBODIMENTS

Figure 1:
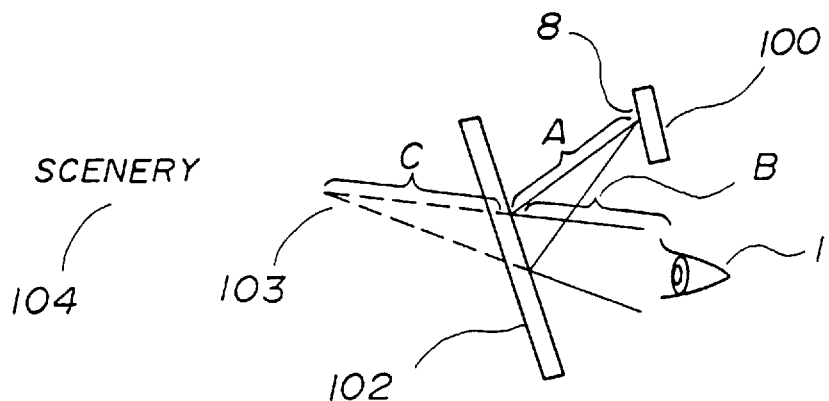
FIG. 1 illustrates a visual range of a conventional flat combiner.
Figure 2:
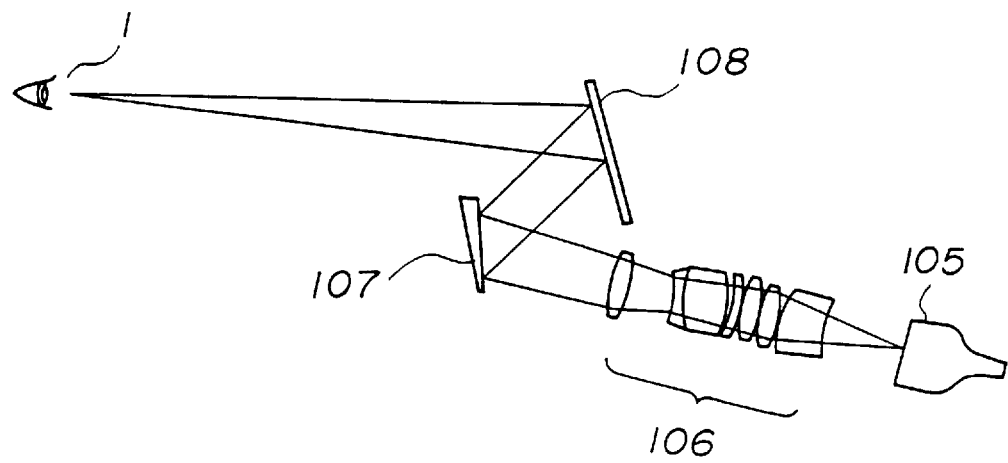
FIG. 2 illustrates an optical system used in the conventional flat combiner.
Figure 3:
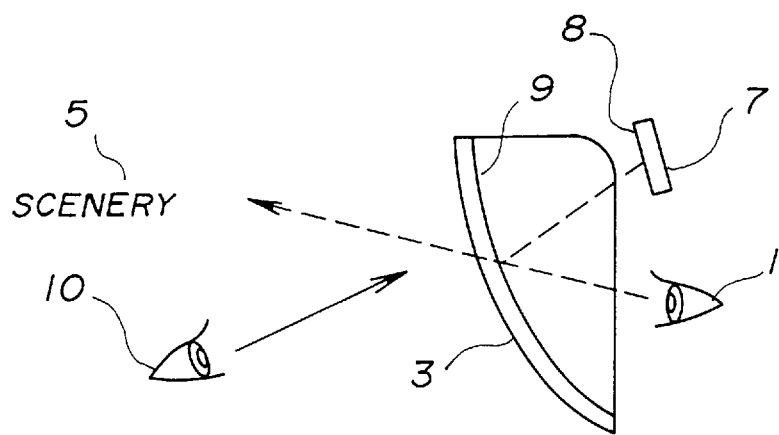
FIG. 3 is a structural outline of a head-up display apparatus according to the present invention.

A description will now be given of an embodiment of a head-up display apparatus according to the present invention, with reference to the drawings. FIG. 3 shows an structural outline of the head-up display apparatus, in which a combiner 3 is provided in the immediate proximity of the viewpoint 1 in the visual range of the viewer. Since this combiner 3 constitutes a half mirror, the viewer can view, from the viewpoint 1, the scenery 5 of the outside world as an image of it is transmitted through the half mirror. Parts of an image 8 displayed by a display device 7 are reflected by the combiner 3 to reach the viewpoint 1. Since the image 8 has its focal distance extended due to a focal distance extending effect of an inner concave surface of the combiner 3 mentioned later, focal adjustment at the viewpoint 1 needs to be conducted to a smaller degree than when the combiner 3 is flat. This eliminates the need to provide an optical system for focal adjustment between the display device 7 and the combiner 3 even when the scenery 5 and the image 8 are viewed from one viewpoint at the same time (an integrated image).

The display device 7 can be embodied by any normal light-emitting (or light projecting) display device including a small-scale CRT (cathode ray tube), an LCD (liquid crystal display) or an LED (light emitting diode). Since there is no need to provide an optical system for focal adjustment between the display device 7 and the combiner 3, the display device 7 can be provided at a position where the image 8 displayed by the display device 7 and passing through the combiner 3 is directly visible to an outsider's viewpoint 10. When we say directly visible, it means that the image displayed by the display device can be visually observed without using a projecting screen or an optical system comprising lenses.

A mounting position of the display device 7, a size of a display area thereof, luminance of the display, an interval between the display device and the combiner 3, reflectance (transmittance) of the combiner 3, a position of the viewpoint 1 and the like may be selected depending on the usage. By configuring the inner concave surface 9 such that a curvature radius thereof is between 80 mm and 150 mm, a head-up display apparatus can be obtained, which allows easy focal point adjustment relative to the scenery 5 and the image 8 as observed from the viewpoint 1.

Figure 4:
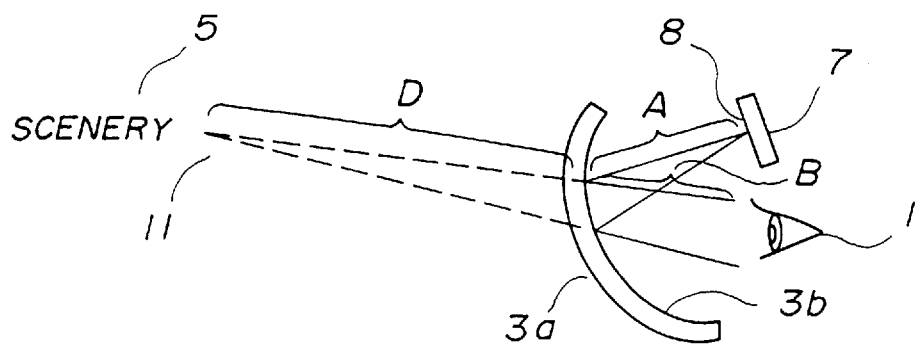
FIG. 4 illustrates a visual range of a combiner according to the present invention.

FIG. 4 illustrates a principle of the combiner 3 according to the present invention of FIG. 3.

FIG. 4 shows a combiner 3a provided with an inner concave surface 3b. As a result of such construction, a virtual image 11 observed by the viewer and derived from the image 8 displayed by the display device 7 has a focal distance of B+D, which is sufficiently longer than A+B. This means that a focal distance between the image 8 and the viewpoint 1 is sufficiently extended. Thus, the need for focal point adjustment at the viewpoint 1 when observing the virtual image 11 and the scenery 5 in the same visual field is eliminated and thus the viewer can focus their eyes on the virtual image 26 and the scenery 5 at the same time.

The combiner can also be a half mirror having a spherical surface with a curvature radius of between 80 mm and 150 mm. A half mirror is a thin body having a reflective function (action of a mirror) and a light-transmissive function (action of a transparent body), wherein a ratio of reflection and transmission can have any value including 50:50, for example 10:90.

Descriptions will now be given of various applications of the head-up display apparatus of the above configuration of the present invention, with reference to FIGS. 5 through 14.

Figure 5:
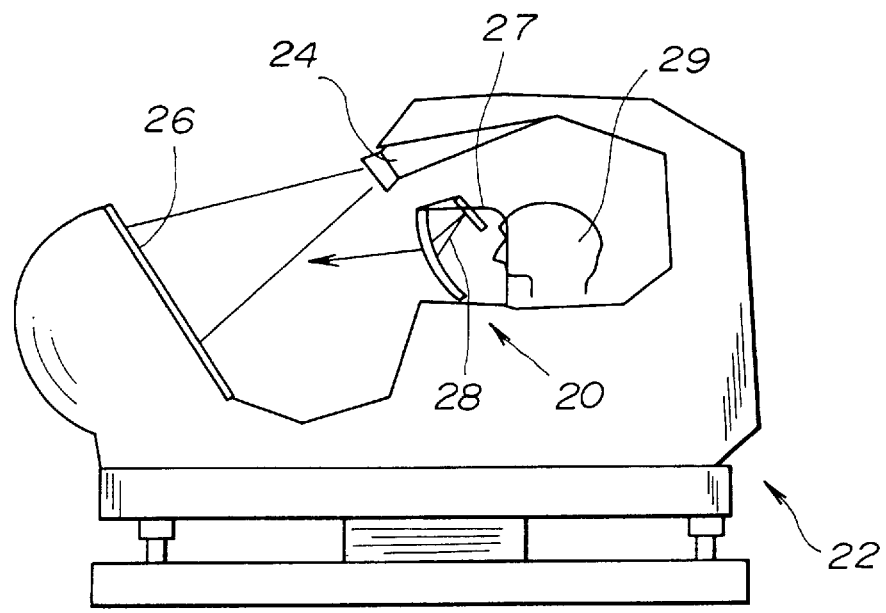
FIG. 5 illustrates a first application of the head-up display apparatus according to the present invention.

FIG. 5 illustrates a first application in which the head-up display apparatus 20 is used in a simulator apparatus 22, and a viewer 29 can simultaneously observe, in the same visual range, a simulation image 26 from a projector 24 and an image 28 displayed by a display device 27 of the head-up display apparatus 20, without conducting any focal point adjustment, the images being represented in a realistic manner. By designing the simulator apparatus 22 as an air battle game machine, providing an image of enemy planes as the simulation image 26 and providing an image of an aiming mechanism as the image 28, it becomes easy to provide an inexpensive air battle game machine giving one a feeling that one is really in an air battle.

Figure 6:
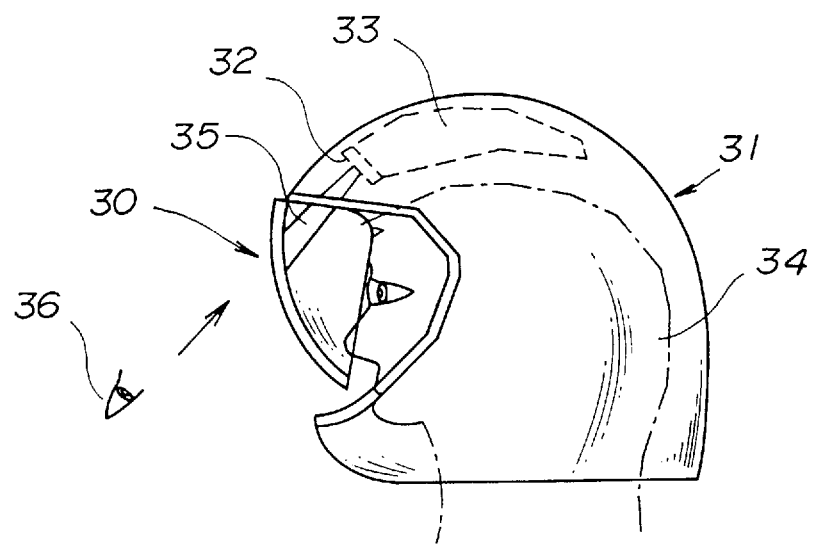
FIG. 6 illustrates a second application of the head-up display apparatus according to the present invention.

FIG. 6 illustrates a second application in which a head-up display apparatus 30 is used as the visor of a visored helmet 31, a display device 32 being built into the visored helmet 31. If a display control apparatus 33 is configured to include a receiver, then a wireless head-up display apparatus is provided, that is, an image apparatus for a simulator and the like, which apparatus has never before been implemented. Such an apparatus can also be used as a simplified display apparatus capable of creating a VR (virtual reality) experience. Since an image 35 in the display device 32 observed by a viewer 34 can also be observed from an external viewpoint 36, it is easy to adjust the simulator apparatus while the viewer is still wearing the visored helmet 31.

According to the first and second applications of the head-up display apparatus of the present invention, an optical system thereof comprises: a combiner provided in front of the eye of the viewer in the visual field of the viewer and having an inner concave surface; and a display part of the display apparatus provided in such a position that a display can be directly observed from the outside. Hence, a lightweight, small and inexpensive head-up display apparatus can easily be obtained, where no complex optical system for focal point adjustment is required. Since no optical system is required between the display device and the combiner, a person other than the viewer can visually observe, from the outside, the contents of a display in the display device. This makes it possible for the other person to easily imagine the contents of a visual field of the viewer, thereby facilitating adjustment of the apparatus and the like. Since the combiner can be provided in the immediate proximity of the viewer's eye, the present invention is effective in that the viewer's eye is subject to only limited movement, and installing and adjustment of the combiner and the display device, etc. become easy.

A description will next be given of a head-up display apparatus according to the third application wherein the apparatus is configured to be attachable to the viewer's head.

Figure 7:
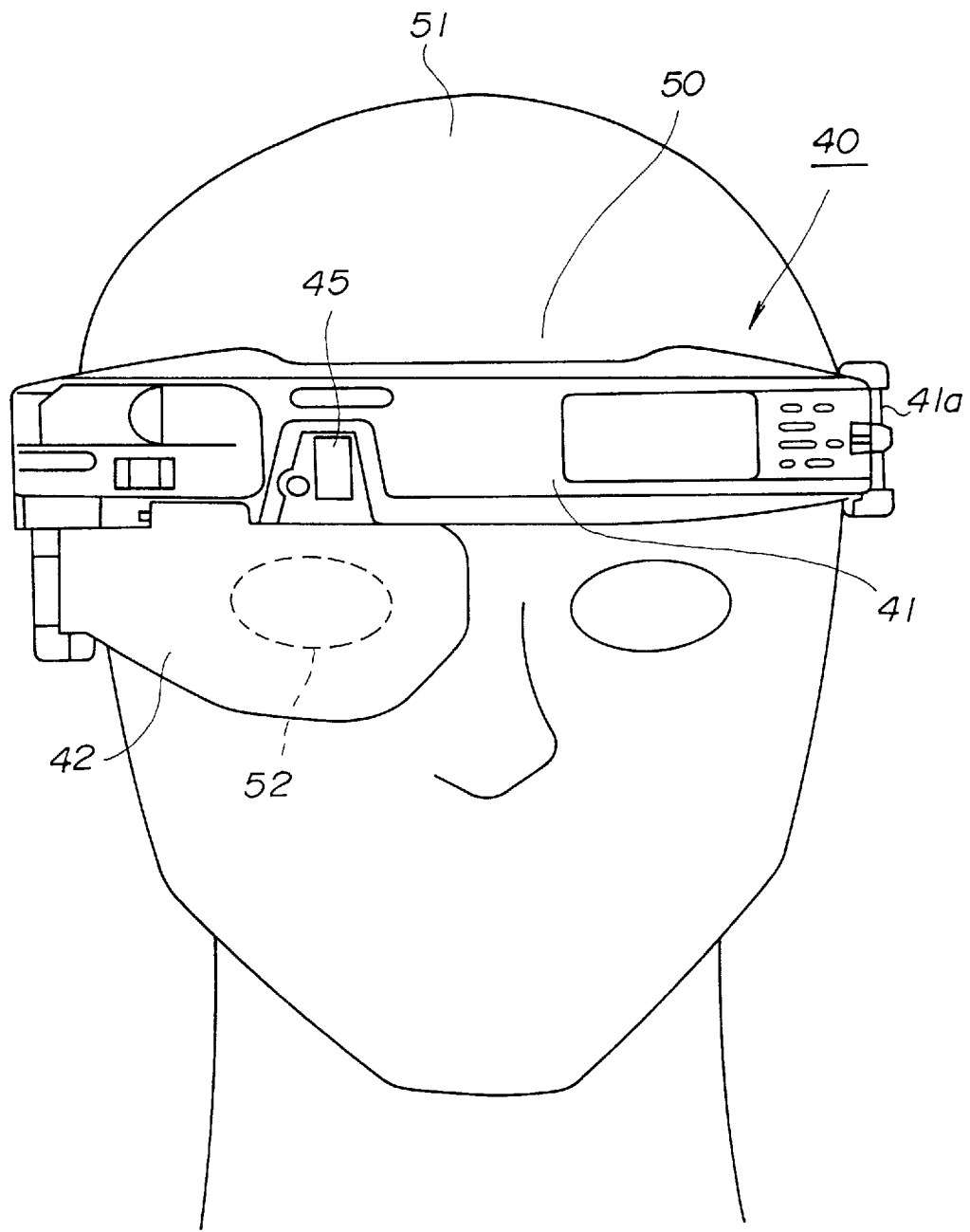
FIG. 7 illustrates a third application of the head-up display apparatus according to the present invention fitted on a viewer's head.

FIG. 7 illustrates a head-up display apparatus 40 fitted on the viewer's head. In the head-up display apparatus 40, a main body part 41 is attached to a forehead 50 of the viewer and is wrapped around a head 51 of the viewer by means of a band part 41a to be fixed on the head. The image displayed on a display device 45 is reflected by a combiner 42 to enter an eye 52 of the viewer to be observed by the viewer.

Figure 8:
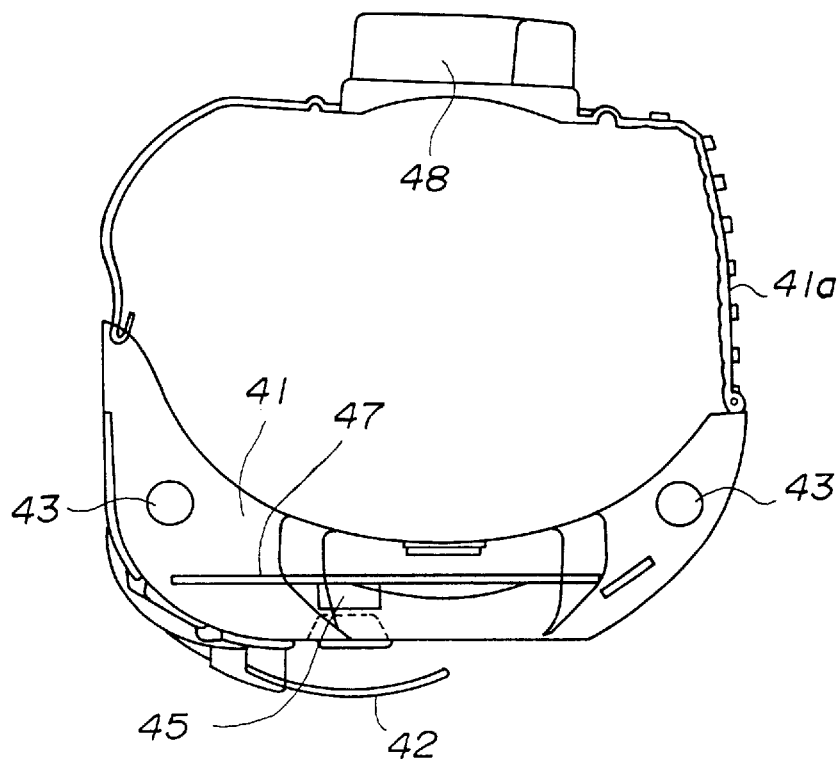
FIG. 8 is a top view of the head-up display apparatus according to the third application of FIG. 6.
Figure 9:
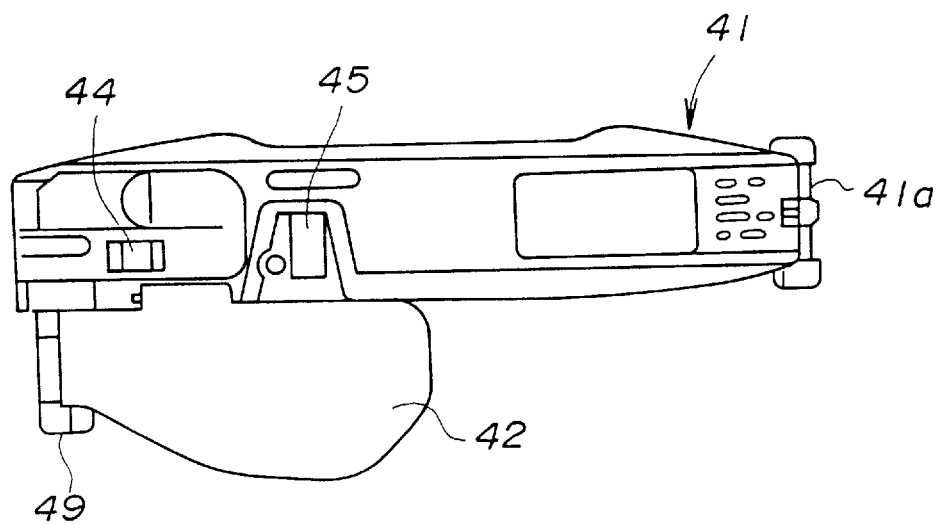
FIG. 9 is a front view of the head-up display apparatus according to the third application of FIG. 6.
Figure 10:
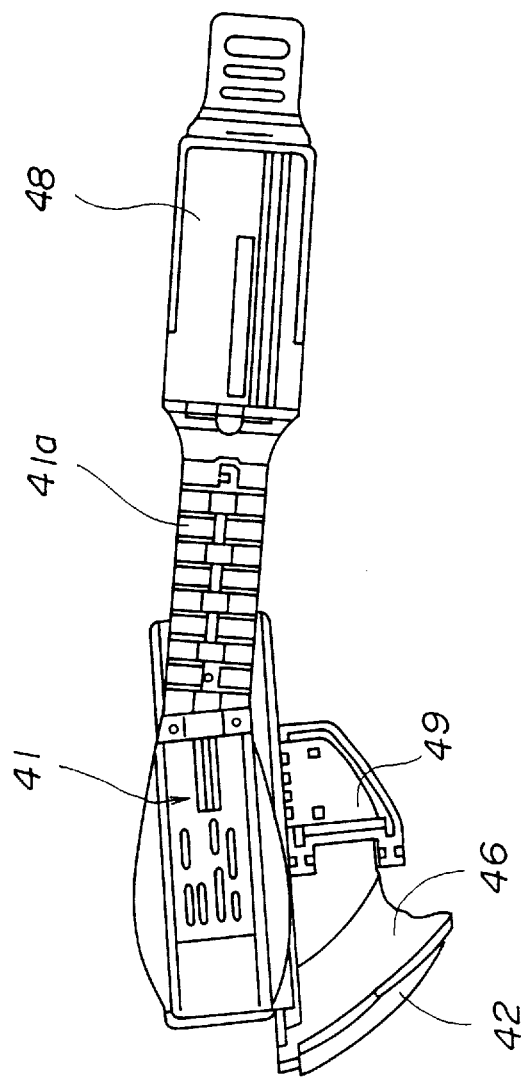
FIG. 10 is a side view of the head-up display apparatus according to the third application of FIG. 6.

FIG. 8 is a top view of the head-up display apparatus; FIG. 9 is a front view of the same; and FIG. 10 is a side view of the same.

An inner part of the main body part 41 has a roughly U like shape fitting a curvature of the forehead and covering the entire forehead. The bottom of the main body has speakers 43 at the right and left corners thereof adjacent to the ears of the viewer. The main body is provided with a downwardly opening depression towards the left of the front thereof, the depression accommodating the display device 45 and a switch 44 provided to the left of the same. An electronic circuit board 47 is accommodated inside the main body, which electronic circuit board is externally supplied with image data to generate an image to be displayed by the display device 45. A part of the band part 41a at the back of the head is adapted to hold a battery case 48.

Referring to FIG. 7, the combiner 42, provided below a left part of the main body part and having a curved inner concave surface with a curvature radius of between 80 and 150 mm and a size large enough to cover the right eye of the viewer, is pivotally mounted on a rotatable axis 49. The position of the combiner 42 can be adjusted by swinging the combiner to the right and left and to the front and back around the rotatable axis. The combiner 42 is a half mirror made of a hard resin. The combiner 42 is located in front of and below the display device 45 so that the image displayed by the display device 45 can be viewed by the right eye 52. Since the combiner 42 having a curved concave surface is located in front of the right eye 52 of the viewer, the image displayed by the display device 45 in the depression is laterally reversed, and this image is reversed so as to obtain a normal image to be observed by the viewer.

Due to the focal distance extension effect described with reference to FIG. 4, the focal distance of the virtual image reflected by the concave surface is extended so as to make it appear as if the object being viewed is further away than it actually is. Since the combiner 42 is a half mirror, the viewer can see the outside scenery, and, to the right eye of the viewer, the image 8 appears to stand out against the scenery 5.

By providing a receiver within the electronic circuit board 47, a wireless head-up display apparatus, that is, an image apparatus for a simulator and the like, can be made, such an apparatus having never before been made. Such an apparatus can also be used as a simplified display apparatus for creating a VR (virtual reality) experience.

Since, in the above third application the apparatus is configured such that the main body part 41 is adjustably fitted to the head of the viewer by means of the band 41a so that a combiner, having an inner concave surface and a size large enough to cover one eye of the viewer, can be provided in the immediate proximity of the right eye of the viewer, this configuration of the apparatus is smaller in scale, lighter in weight and less expensive than those of the first and second applications.

Since the combiner can be provided in the immediate proximity of one eye of the viewer, the viewer's eye is subject to only limited movement, and setting and adjustment of the combiner, the display apparatus and the like become easy. Since no optical system is required between the display device and the combiner, contents of the display in the display device can be observed from a person other than the viewer. Further, because the eye of the viewer not covered by the combiner can see directly outside, adjustment of the machine can be easily conducted.

Figure 11:
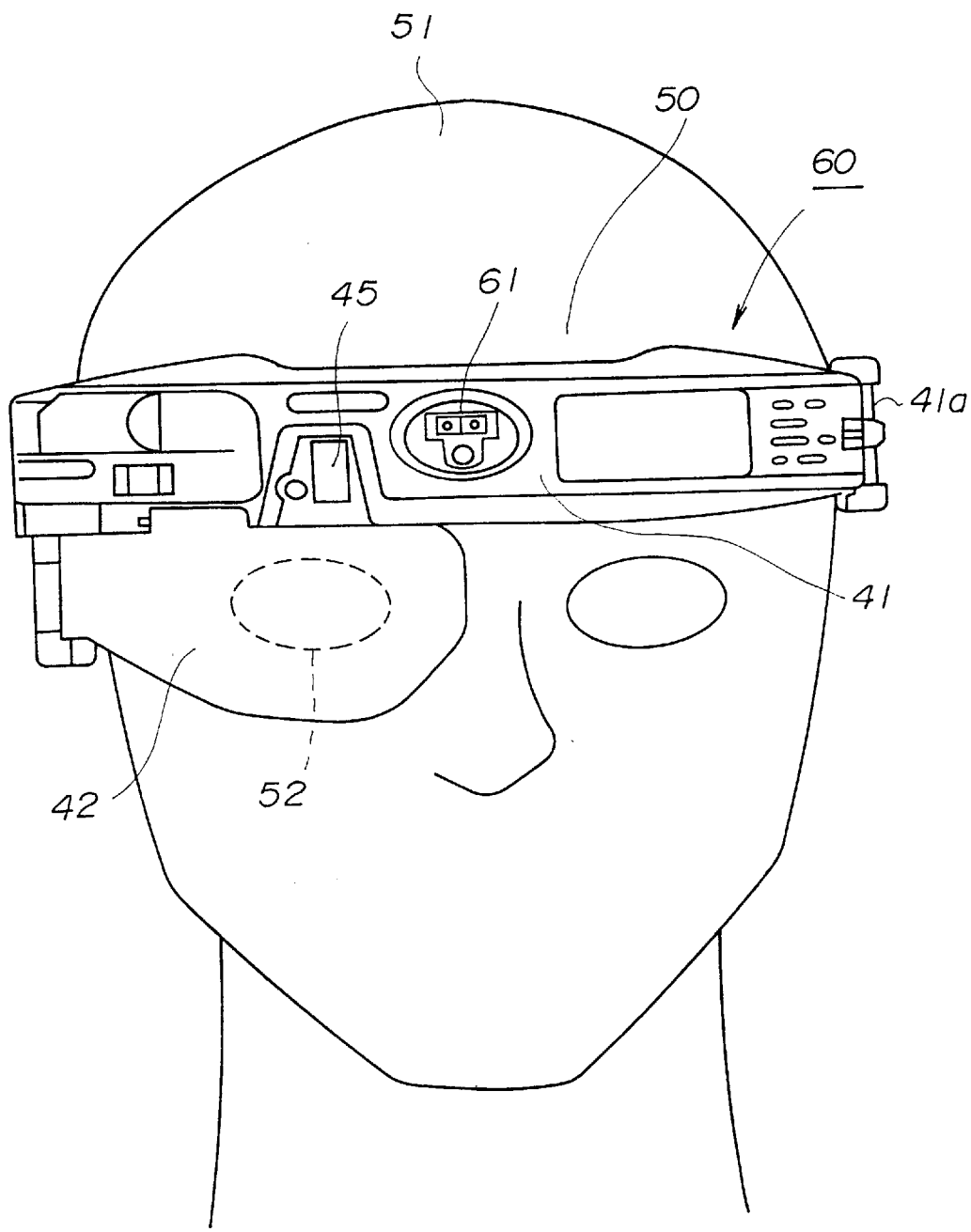
FIG. 11 illustrates a fourth application of head-up display apparatus according to the present invention fitted on the viewer's head.

A description will now be given of the head-up display apparatus according to the fourth application, which apparatus is configured so that it can be used in a beam gun shooting game. FIG. 11 shows a head-up display apparatus 60 fitted on the head. The head-up display apparatus 60 is configured to be usable in a shooting play where two or more players hold a beam gun used in shooting at each other, which gun emits an infrared light and the like, and is outfitted such that the main body part of the apparatus is attached to the forehead 50 and wrapped around the head 51 by means of the band part 41a to be fixed on the head. When the beam (infrared) shot by one of the players hits the light intercepting part 61 provided in the head-up display apparatus 60, the display part 45 shows a display indicating that a hit has occurred on the basis of a detection signal from the beam intercepting part 61, the display then entering the eye 52 after being reflected by the combiner 42.

Figure 12:
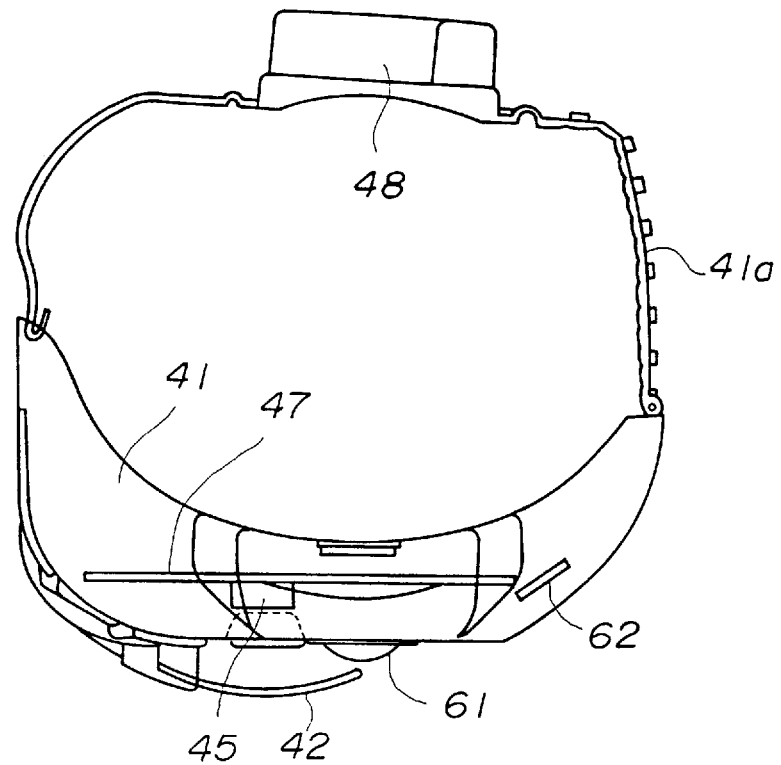
FIG. 12 is a top view of the head-up display apparatus according to the fourth application of FIG. 10.
Figure 13:
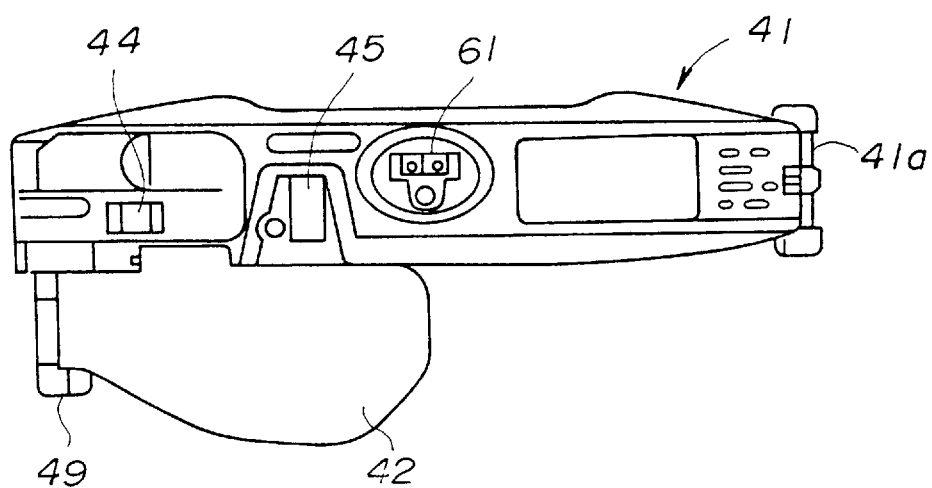
FIG. 13 is a front view of the head-up display apparatus according to the fourth application of FIG. 10.
Figure 14:
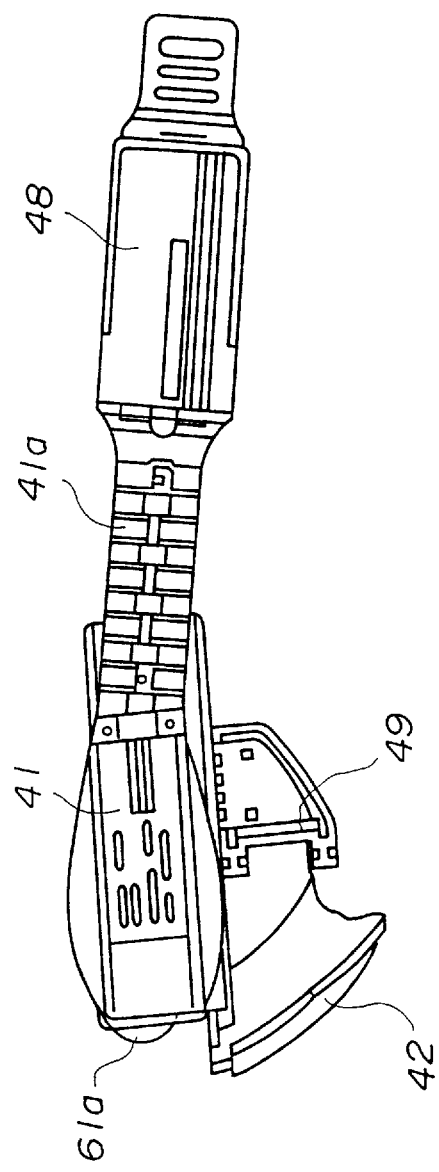
FIG. 14 is a side view of the head-up display apparatus according to the fourth application of FIG. 10.

FIG. 12 illustrates a top view of the head-up display apparatus 60; FIG. 13 is a front view of the same; and FIG. 14 is a side view of the same.

The inner part of the main body part 41 has a roughly U like shape fitting a curvature of the forehead and covering the entire forehead. The front of the main body is provided at its center with the light intercepting part 61 having a light sensor. A buzzer 62 is built into the main part toward the right side thereof. A downwardly opening depression is provided to the left of the light intercepting part 61, the depression accommodating the display device 45 and the switch 44 located to the left thereof. The electronic circuit board 47 is accommodated within the main body part, and a part of a band part 21a at the back of the head is adapted to old a battery case 48.

The light intercepting part 61 of the main body part protrudes out of the front of the main body part and has a light intercepting surface 61a allowing an irregular reflection so that not only light coming from straight in front of the light intercepting surface 61a but also light coming from the right and left of the surface and from above and below it is applied to the light sensor behind the light intercepting surface 61a. When the emitted light hits the light intercepting surface, it is detected by the light sensor which in turn transfers a hit signal to the electronic circuit board 47. The electronic circuit board 47 controls the buzzer 62 so that it emits, in response to the hit signal, a sound indicating a hit has occurred and the board then causes an 8-segment numeric display LED of the display device 45 to display a numeral relating to the hits. When viewed from the front, this display is laterally reversed. In an initial state immediately following closing of a switch, the numeral 9 is displayed. Every time the light intercepting part 61 detects a hit, the displayed number is decremented.

Referring to FIG. 11, the combiner 42, provided below a left part of the main body part and having a curved inner concave surface with a curvature radius of between 80–150 mm and a size large enough to cover the right eye of the viewer, is pivotally mounted on the rotatable axis 49. As mentioned earlier, the combiner 42 is formed of a semi-transparent hard resin. The combiner 42 is located in front of and below the display device 45 so that a digital display created by LED's of the display device 45 can be viewed by the right eye 52. Since the combiner 42 having a curved inner concave surface is located in front of the right eye 52 of the viewer, a laterally reversed numeric display displayed by the display apparatus 45 provided in a depression is laterally reversed to produce a normal numeric display to be viewed by the viewer. The focal distance of the virtual numeric image reflected by the curved concave surface is extended due to the focal distance-extension effect described with reference to FIG. 4 so as to make it appear as if the object being viewed is further away than it actually is.

Since the combiner 42 is semi-transparent, the viewer can see the outside scenery, and to the right eye of the viewer, a numeric display displayed by the display device 45 appears to stand out against the scenery.

In the above fourth application, the apparatus is configured such that the light intercepting part 61 at the central part of the main body body 41 is added to the head-up display apparatus 60 according to the aforementioned third application so that a ray gun play is enabled. Accordingly, in addition to the same function as the third application, this fourth application has the advantage of enabling a player to engage in a more realistic ray gun game than the apparatus having a light intercepting part provided on a jacket worn on the body because, when a shooting is simulated to take place in a city area, a player will identify, before shooting at an enemy player, an enemy player by visual observation while projecting their face, especially the part from the eye upward, from behind a hiding place.

Another advantage is that when a ray shot from the enemy player's ray gun hits the light intercepting part 61, the buzzer emits a sound, and the viewer can easily find out their score displayed by the display device 45 without having to excessively adjust their visual field during a shooting game.

When the head-up display apparatus 60 is used in a ray gun game, a player can easily finds out their score. This arrangement has an advantage, as contrasted to a ray gun game apparatus having a score display apparatus provided in a jacket, in that the player does not have to excessively adjust the visual field for checking of the score display and to remember a hit score, so that the player can be engaged in a game in a more relaxed manner.

While the head-up display apparatus 60 according to the fourth application uses LED's for digital diaplay in the display device 45, the display device 45 can also be a small liquid crystal display plate.

In an alternative configuration, a transceiver 54 is built into the electronic circuit board 47, which transceiver is used so that the two players on the same side can communicate with each other while collaborating to shoot ememy players. In such a case, a speaker may be preferably provided near the ear, and a transmitting receiving circuit and a band switching circuit may be preferably provided in the apparatus.

While the display apparatus 45 and the combiner 42 are arranged at the right side in the fourth application, these can also be at the left side. The buzzer 62 can be substituted for a speaker, or it is possible to inform the wearer (viewer) that a ray has hit them by vibrating a vibrating body.

The present invention is not limited to the specifically described embodiments, but various variations and modifications may be made without departing from the present invention.

What is claimed is:

1. A head-up display apparatus comprising:
    a display device for displaying an image including various items of information; and
    a combiner provided in front of a viewer in the viewer's visual field, for allowing an outside image lying in said visual field to be passed through said combiner and for reflecting an image displayed in said display device so that the outside image transmitted through the combiner and the displayed image reflected thereby are integrated to form a virtual image in the same visual field of the viewer,
    said combiner having a concave surface facing the viewer and being provided in the immediate proximity of the viewer, with said concave surface being shaped and located at a distance from said device so that said viewer may observe said virtual image at a defined distance from the viewer in which the viewer can recognize the various items of information as a result of said concave surface reflecting the light beam emitted by said display device as if said virtual image is present on the side of said combiner opposite to the side where said viewer is located and at a location far away from said combiner and with
    said display device being provided in such a position that the image of said display including said various items of information can be directly observable from the outside through said combiner.

2. The head-up display apparatus as claimed in claim 1, wherein said combiner is a half mirror having a curvature radius of between 80 mm–150 mm.

3. The head-up display apparatus as claimed in claim 1, wherein said combiner is provided in the visual range of one eye of the viewer.

4. A head-up display apparatus as claimed in claim 3, further comprising:
    a main body part attached to an area extending on the forehead of the viewer from the left to the right temples of the forehead on the front of the viewer's head; and
    a band body which connects the right and left sides of the viewer's head and fixes said main body part to the viewer's head by wrapping the band body around the viewer's head,
    said combiner being provided in front of and below said main body part.

5. A head-up display apparatus as defined in claim 1, wherein the focal distance of said virtual image is significantly longer than the real light path distance between said display device and said viewer via said concave surface.

6. A The head-up display apparatus as claimed in claim 1, wherein said display device is provided in a helmet in which the viewer can adjustably fit upon the viewer's head, and said combiner is provided in the front of said helmet.

7. A head-up display apparatus comprising: a main body part attached to an area extending about the forehead of a viewer from the right to the left temples of said forehead on the front side of the viewers head;
    a band body for fixing said main body part to the head by wrapping the band body around the head with said band body having right and left ends for adjusting the main body part about the viewers head,
    a light intercepting part for receiving incoming light at the front of said main body part;
    controlling means built into said main body part, which issues a notifying signal on the basis of a light-intercepting signal from said light intercepting part as well as issuing a display signal;
    a notifying part built into said main body part, which notifies the viewer by means of said notifying signal;
    a display part provided at the right or the left of the front of said main body, which provides a display variable in accordance with said display signal;
    a combiner provided in front of a viewer in the viewer's visual field, including a light-transmissive reflective part having a curved concave surface in front of and below said display part and provided below the main body to face inward with said concave surface being shaped and located at a distance from said display part so that said viewer may observe the virtual image produced at a defined distance from the viewer as a result of said concave surface reflecting the light beam emitted by said display part as if said virtual image is present on the side of said combiner opposite to the side where said viewer is located and at a location far away from said combiner and for permitting an image of said display part to be observed outside of said display apparatus.

8. A head-up display apparatus as defined in claim 7, wherein the focal distance of said virtual image is significantly longer than the real light path distance between said display device and said viewer via said concave surface.

9. A head-up display apparatus comprising:
    a main body part applied to an area extending about the forehead of a viewer from the left to the right temples on the front side of the viewer's head;
    a band body for fixing said main body part to the head by wrapping the band body around the head with said band body having right and left ends for adjusting the main body part about the viewer's head;
    a light intercepting part for receiving incoming light at the front of said main body part;
    controlling means built into said main body part, which issues a display signal on the basis of a light-intercepting signal from said light intercepting part; a display part built into said main body part and provided at the right or the left of the front of the said main body, which provides a display variable in accordance with said display signal;
    a combiner provided in front of a viewer in the viewer's visual field, including a light-transmissive reflective part having a curved concave surface in front of and below said display part and provided below the main body to face inward with said concave surface being shaped and located at a distance from said display part so that said viewer may observe the virtual image produced at a defined distance from the viewer as a result of said concave surface reflecting the light beam emitted by said display part as if said virtual image is present on the side of said combiner opposite to the side where said viewer is located and at a location far away from said combiner and for permitting an image of said display part to be observed outside of said display apparatus.

10. A head-up display apparatus as defined in claim 9, wherein the focal distance of said virtual image is significantly longer than the real light path distance between said display device and said viewer via said concave surface.

11. A light beam intercepting apparatus comprising:

a main body part attached to an area extending about the forehead of a viewer from the left to the right temples of said forehead on the front side of the viewer's head;

a band body for fixing said main body part to the head by wrapping the band body around the head with said band body having right and left ends for adjusting the main body part about the various head;

a light intercepting part for receiving incoming light at the front of said main body part;

controlling means built into said body part, which issues a notifying signal on the basis of a light-intercepting signal from said light intercepting part; and a notifying part built into said main body part, which notifies a viewer by means of said notifying signal;

a display part built into said main body part and provided at the right or the left of the front of the said main body, which provides a display variable in accordance with said display signal;

a combiner provided in front of a viewer in the viewer's visual field, including a light-transmissive reflective part having a curved concave surface in front of and below said display part and provided below the main body to face inward with said concave surface being shaped and located at a distance from said display part so that said viewer may observe the virtual image produced at a defined distance from the viewer as a result of said concave surface reflecting the light beam emitted by said display part as if said virtual image is present on the side of said combiner opposite to the side where said viewer is located and at a location far away from said combiner and for permitting an image of said display part to be observed outside of said display apparatus.

12. A head-up display apparatus as defined in claim 11, wherein the focal distance of said virtual image is significantly longer than the real light path distance between said display device and said viewer via said concave surface.

* * * * *